United States Patent [19]
Bress et al.

[11] 3,798,021
[45] Mar. 19, 1974

[54] POLLUTION ELIMINATION FOR FERTILIZER PROCESS

[75] Inventors: Dellason F. Bress, Murray Hill; Carmen A. Petrarca, Caldwell, both of N.J.

[73] Assignee: Foster Wheeler Corporation, Livingston, N.J.

[22] Filed: Aug. 21, 1972

[21] Appl. No.: 282,220

[52] U.S. Cl............................ 71/28, 55/70, 55/94, 71/59, 71/64 DB
[51] Int. Cl. ...................... C05c 9/00, B01d 47/06
[58] Field of Search ............. 55/68, 70, 84, 85, 90, 55/93, 94, 222, 223, 229, 233; 71/28, 59, 64 DB

[56] References Cited
UNITED STATES PATENTS
3,344,585  10/1967  Hollowell ............................. 55/94
3,395,510  8/1968  Bannes ................................. 55/94

*Primary Examiner*—Charles N. Hart
*Attorney, Agent, or Firm*—Marvin A. Naigur, Esq.; John E. Wilson, Esq.

[57] ABSTRACT

In a continuous process for the manufacture of fertilizer, waste heat from the process is passed in indirect heat exchange relation with a stream of air and water entrained fertilizer solids. In this manner, it is possible to remove substantially pure water and air together with the fertilizer containing solution which can be used in the manufacture of the fertilizer.

18 Claims, 2 Drawing Figures

POLLUTION ELIMINATION FOR FERTILIZER PROCESS

BACKGROUND OF THE INVENTION

In conventional processes for the production of nitrogen fertilizers, ammonimum nitrate and urea are initially synthesized with relatively large quantities of water. The final stages of solidifying the fertilizer into a substantially anhydrous product result in the water which is removed being contaminated with the fertilizer and its components. Further, conventional solidification methods result in large quantities of air being contaminated with entrained fertilizer dust. Accordingly, it is an object of the present invention to remove contaminants from both the air and water discharged from the process.

In a conventional ammonium nitrate plant, ammonia and air are reacted to produce nitrogen dioxide, and subsequently the nitrogen dioxide and water are combined to produce nitric acid. The nitric acid is neutralized with ammonia to produce an ammonium nitrate solution which is then sent to an evaporator for obtaining a concentrated ammonium nitrate mixture which is sent to a prill tower where ammonium nitrate prills are formed by contact with air. A conveyor at the bottom of the prill tower collects the ammonium nitrate prills, which are then passed to rotary drying and cooling kilns to produce the ammonium nitrate product.

The present invention as applied to an ammonium nitrate process is primarily concerned with two pollution streams, namely, a first stream from the neutralizer, containing nitric oxide, nitric acid, ammonium nitrate and water, and a second stream from the top of the prill tower containing air and entrained solid ammonium nitrate. Conventionally, the first stream is either passed into the atmosphere or is condensed and conveyed into a sewer line, and the second stream is exhausted into the atmosphere. It should be noted that ammonium nitrate can be fairly devastating to the surrounding land and in particular, adversely affects water streams in the area.

In a urea process the same general concept would apply as in the case of the ammonium nitrate process, except that the first stream would consist of low pressure steam, and a third stream containing dilute fertilizer concentrate would also be passed in indirect heat exchange with the first stream.

Thus, in accordance with the present invention, polluted waste products which are generally produced in nitrogen fertilizer processes can be purified such that unpolluted air and water can be exhausted into the atmosphere, and the materials that ordinarily would contaminate the atmosphere can be returned to the process for use in the manufacture of fertilizer.

SUMMARY OF THE INVENTION

In accordance with illustrative embodiments demonstrating objects and features of the present invention, there is provided a continuous process for the manufacture of nitrogen fertilizer. Accordingly, in the first embodiment of the process for producing ammonium nitrate, a first stream containing water, vapor and contaminants produced during the manufacture of fertilizer is passed into a heat exchange zone in indirect heat exchange relation with a second stream containing air and entrained fertilizer solids such that a portion of the water, vapor and contaminants from the first stream are condensed to increase the water carrying capacity of the second stream. The condensed portion of the first stream is recirculated in countercurrent contact with the second stream from the heat exchange zone such that water free of contaminants is vaporized from the condensed portion of the first stream and entrained solids are removed from the second stream. Thus, substantially pure water and air can be removed and a fertilizer containing solution is produced which can be used in the manufacture of fertilizer.

In the second embodiment of the process for production of urea the first stream consists of low pressure steam which is a by-product of the urea process, and the second stream contains air and entrained fertilizer solids. Also, a third liquid stream containing dilute fertilizer concentrations is passed in indirect heat exchange relation with the first stream.

BRIEF DESCRIPTION OF THE DRAWINGS

The above brief description as well as further objects, features, and advantages of the present invention will be more fully appreciated by referring to the following description of presently preferred but nonetheless illustrative embodiments in accordance with the present invention when taken in connection with the accompanying drawings, wherein.

BRIEF DESCRIPTION OF THE PREFERRED EMBODIMENTS

I. Ammonium Nitrate Process

Figure 1:
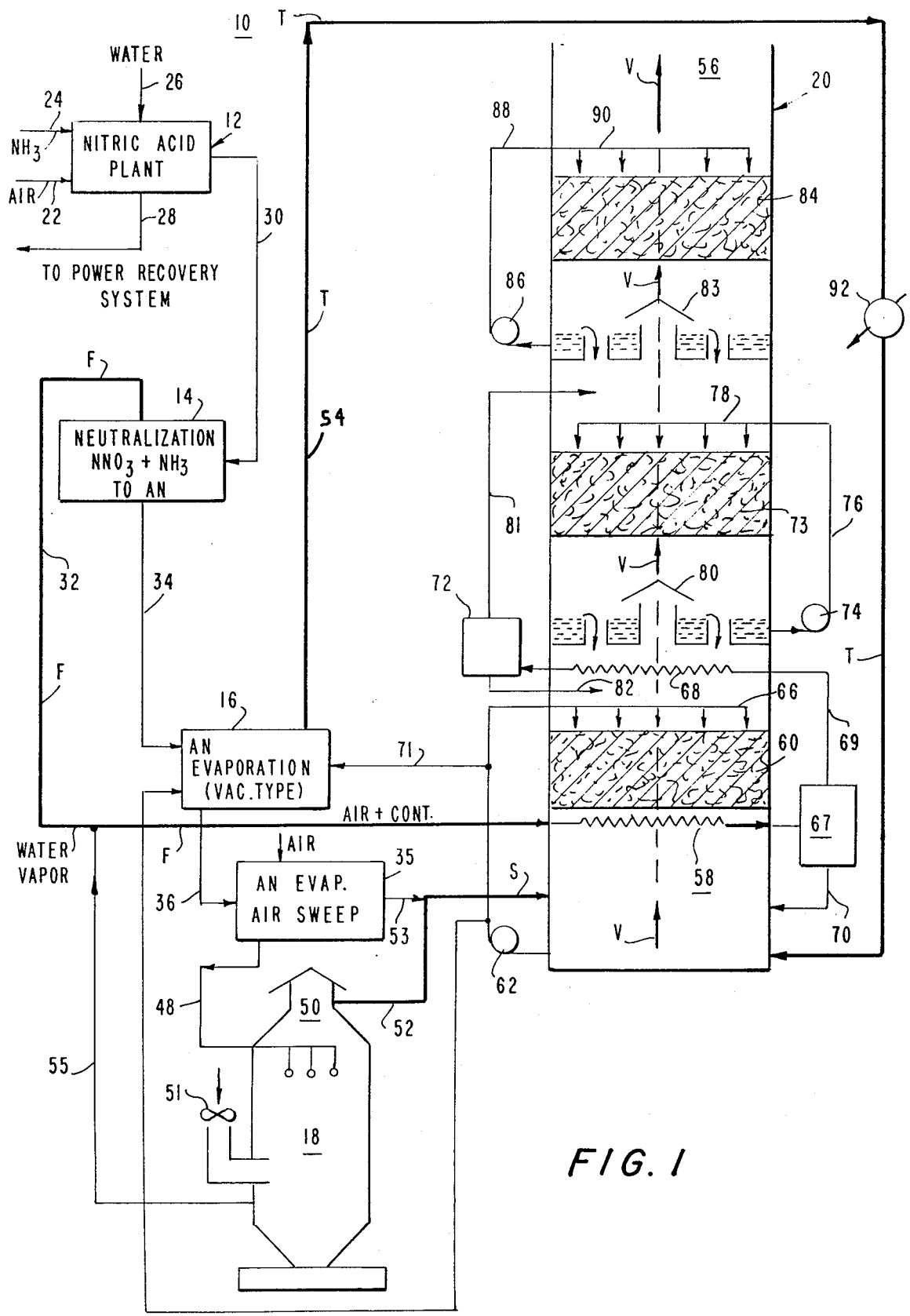
FIG. 1 is a schematic representation of an ammonium nitrate process incorporating the present invention.

Referring now specifically to FIG. 1 of the drawings, there is shown an ammonium nitrate process generally designated by the reference numeral 10 which comprises an oxidation and absorption zone 12, a neutralization and adjustment zone 14, evaporation zone 16, a prilling tower 18, and a pollution control system 20.

As is typical in the production of ammonium nitrate, nitric acid is first made in zone 12 by introducing ammonia and air by line 22 and line 24 respectively to produce nitrogen oxide which is further oxidized into nitrogen dioxide and passed into the absorption section of zone 12 where it is absorbed in water introduced by line 26 to form nitric acid. A small amount of residual oxides including nitric oxide and nitrogen dioxide are passed from zone 12 through line 28 to a conventional power recovery system, which is not shown in the drawings. The entire oxidation-absorption zone 12 and power recovery system comprise a conventional nitric acid plant.

A line 30 is connected from zone 12 to zone 14 for conveying the nitric acid solution which is generally from 55% to 65% $HNO_3$. In zone 14 additional ammonia is introduced and reacted with the nitric acid to form an ammonium nitrate solution which can vary from 83 to 93 percent ammonium nitrate according to the neutralization process used, which solution is conveyed to evaporation zone 16. In the formation of the ammonium nitrate solution in zone 14, various pollutants are also formed as a by-product which includes a vapor mixture of nitric oxide and $HNO_3$ and an entrained solution of ammonium nitrate and water. These pollutants form a first contaminant stream which is designated by a directional arrow and reference numeral F. A line 32 in flow communication between the adjustment zone 14 and pollution system 20 is provided for conveying the first contaminant stream F to the pollution control system 20. The ammonium nitrate stream from line 34 is passed to the vacuum evaporator 16 in order to obtain a concentrated ammonium nitrate stream of from 94 to 99.5 percent ammonium nitrate. The concentration of the product will depend on whether low or high density prills are being made. In the case of high density prills, an alternative procedure is to carry out evaporation in two steps with final concentration to 99.5 percent taking place in air sweep unit 35 that is connected to evaporation zone 16 by line 36 and is passed to the prill tower 18 by means of a line 48.

The prill tower 18 includes a nozzle distribution system 50 at the uppermost section of the tower in which the concentrated ammonium nitrate solution is passed through line 48 and an air movement system 51 at the lower portion of the tower. Thus, dispersed droplets of ammonium nitrate can be gravity released from the top of the tower 18 in countercurrent flow to the stream from air movement system 51 which is directed upwardly through the tower 18. Accordingly, solidified prills of ammonium nitrate and a small amount of residual water reach the bottom of tower 18 and are usually transported by a conveyor system to a rotary drying and cooling kiln for further processing, but for high density prills, the dryer is not required. The ascending air stream from air movmeent system 51 is exhausted through the stack of the prill tower 18, and forms a second stream of contaminants consisting of air and entrained solid particles of ammonium nitrate, which has been designated by a directional arrow and the reference letter S. The second contaminant stream is conveyed to the pollution control system 20 by means of line 52 which is connected between the prill tower 18 and the bottom portion of the pollution control system 20. Between line 52 and the ammonium evaporator and air sweep unit 35 there is provided a line 53 for introducing additional water, air, and entrained particles of ammonium nitrate from air sweep evaporator 35, when used, to the second stream of contaminants S.

A third stream of contaminants consisting essentially of water condensed in evaporation zone 16 but also containing ammonium nitrate and ammonia, designated by a directional arrow and the reference letter R, may also be introduced into air pollution control system 20 by means of a line 54 which is in flow communication between the vacuum evaporator 16 and the pollution control system 20.

It should be understood that the third contaminant stream T or the portion of second contaminant stream S introduced in line 53 from air sweep evaporator may not always both be present since the evaporation may be carried out solely by a vacuum evaporator 16 or with air sweep evaporator 35. Whatever means are used the pollutant stream T through line 54 will be introduced to zone 20.

It is the practice in ammonium nitrate plants to frequently wash down the prill tower 18 and processing area and this wash water is also a potential pollution stream. If desired, this wash water may be added to the pollution control system via line 55.

In accordance with the present invention, the pollution control system 20 comprises a tower 56, the bottom portion of which is provided with a first heat exchange coil 58 and a first scrubbing section 60 provided with a conventional low pressure drop, bulk scrubbing medium. Thus, the tower 56 receives the first contaminant stream F through line 32, which is connected in flow communication with first heat exchange coil 58, second contaminant stream S through line 52, and the third contaminant stream T through line 54. It should be noted that the first contaminant stream F contains a relatively large amount of water vapor in relation to the small amount of ammonium nitrate which is present, and the second contaminant stream S contains a large volume of air, in relation to a small amount of ammonium nitrate which is present. Since the first contaminant stream F is at a higher temperature than the second contaminant stream S, water is condensed in stream F and the heat exchange relationship results in a rise in the temperature of the second contaminant stream S, thereby increasing the water carrying capacity of the second contaminant stream S. The path of the second stream S and the third stream T in the tower 56 can be followed by the directional arrows designated V and hereafter referred to as the vapor stream V. Accordingly, after the vapor stream V passes in indirect heat exchange relation with the first heat exchange coil 58, the stream V enters a lower scrubbing zone 60 to remove entrained ammonium nitrate particles and at the same time vaporize the water. Below the lower scrubbing zone 60 the third contaminant stream T is mixed with recirculating liquid and circulated by pump 62 into line 64 and distribution nozzle system 66. A first separator 67 is connected in flow communication with the first heat exchange coil 58, and a second heat exchange coil 68 is disposed above lower scrubbing zone 60, with line 69 connecting the first separator 67 and the second heat exchange coil 68 in flow communication. Thus a portion of the water and contaminants from stream F are condensed in the first heat exchange zone 58 and separated from the remaining vapor in the first separator 67, with the vapor passing overhead through line 69 into the second heat exchanger 68 and with the liquid being returned to the bottom of the tower 56 through line 70. The contaminated water is dispersed through the first spray nozzle system 66 over lower scrubbing zone 60 in countercurrent flow to the ascending vapor stream V which is passing upwardly in the tower 56. In this manner, water free of contaminants is vaporized from the condensed portion of the liquid contaminant stream which is passed through the lower spray nozzle system 66 and entrained ammonium nitrate particles are removed from the ascending vapor stream V in the first scrubbing zone 60.

A portion of the stream circulating through line 64 is withdrawn via line 71 to be circulated to evaporation system 16. In this manner, the pollutants are recovered and recycled to the process in a moderately concentrated solution.

The second heat exchange coil 68 is connected in flow communication to a second separator 72 and an intermediate scrubbing zone 73 is disposed above the second heat exchanger 58. Thus, a second solution removal cycle is achieved by providing an intermediate pump 74 connected in a continuous line 76 to an intermediate spray nozzle system 78 which is disposed in the upper portion of intermediate scrubbing zone 73. A combined lower stack and trough structure 80 is disposed between the second exchange coil 68 and the intermediate scrubbing zone 73 for collecting and recirculating a more dilute solution of ammonium nitrate than in the lower zone 60. Accordingly, during the second pollution removal cycle, excess solution overflows into the lower zone 60, and the water, vapor and contaminants from line 69 are passed through the second heat exchanger 68 in indirect heat exchange relationship with the vapor stream V passing upwardly from the first scrubbing zone 60. In the second separator 72, the pollution stream from the second heat exchanger 68 is condensed, with the vapor passing overhead through line 81 to the tower above the intermediate spray nozzle system 78 and with liquid being returned through line 82 to the portion of tower 56 between the second heat exchanger 68 and the lower nozzle system 66. Also, during the second pollution removal cycle, the liquid which is collected along the lower stack and trough structure 80 is drawn off by means of the intermediate pump 74 through line 76 into the intermediate spray nozzle system 78 such that the contaminated liquid can be sprayed over the intermediate scrubbing zone 73 in countercurrent flow with respect to the ascending vapor stream V which is passing upwardly through the intermediate scrubbing zone 73. Thus, in the second pollution removal cycle, water free of contaminants is vaporized from the condensed portion of the pollution stream which is passed through the second spray nozzle system 78, and entrained ammonium nitrate particles are removed from the vapor stream V in the intermediate scrubbing zone 73.

A third pollution removal cycle is carried out by passing the vapor stream V from the intermediate scrubbing zone 73 through an upper stack and trough structure 83, into an upper scrubbing zone 84. The solution of water and contaminants which is collected in the upper stack and trough structure 83 is drawn out of the tower 56 by means of a third pump 86 which is connected in a continuous line 88 to an upper spray nozzle system 90, disposed above the upper scrubbing zone 84. Accordingly, the contaminated water is dispersed through the upper spray nozzle system 90 over the upper scrubbing zone 84 in countercurrent flow to the ascending vapor stream V which is passing upwardly through the upper scrubbing zone 84. In this manner, the ascending vapor stream V which passes through the upper scrubbing zone 84 can be exhausted into the atmosphere as air, which is substantially free of contaminants. The very dilute solution of contaminants collected in the upper zone 84 overflows structure 83 into the intermediate zone 73.

According to the neutralization and evaporation processes selected in zones 14, 16, and 35, it may be necessary to cool the recirculating stream in the third contaminant stream T. Accordingly, a cooler 92 is provided in line 54 for heat removal, thereby condensing water from the air in upper scrubbing zone 84. In this manner, sufficient water is obtained to maintain the desired solution strength in lower scrubbing zone 60.

In order to more clearly describe and illustrate the advantages of the ammonium nitrate process 10 of the present invention, reference is made to the following specific example:

EXAMPLE I

An example of the invention as applied to a typical ammonium nitrate production facility follows. This plant uses a neutralization process which produces 83 percent ammonium nitrate solution, part of which is sold as solution and the balance of which is evaporated in two steps and formed into prills for sale.

Plant specification:
Nitric acid production.............................. 500 tons/day as 100% $HNO_3$ (zone 12).
Nitric acid strength.................................. 56% $HNO_3$ (zone 12).
Ammonium nitrate production.................. 635 tons/day as 100% $NH_4NO_3$ (zone 14).
Ammonium nitrate solution...................... 83% $NH_4NO_3$ (zone 14).
83% solution sales................................... 185 tons/day as 100% $NH_4NO_3$ (zone 14).
High density prills made........................... 450 tons/day as 100% $NH_4NO_3$ (prill tower 12).

| Pollutant streams fed to Pollution control system 20 in lbs/hr | | Air | Water | Nitrate pollutant | Form | °F temp. |
|---|---|---|---|---|---|---|
| (32) | Neutralizer overhead | | 22,000 | 16.65 | Vapor | 250 |
| (53) | Air swept evaporator | 7,450 | 1,450 | 9.00 | Vapor | 330 |
| (52) | Prill tower vent | 723,000 | 11,980 | 61.50 | Vapor | 110 |
| (54) | Vacuum evaporator cond | | 7,000 | 1.00 | Liquid | 140 |
| | Wash water | | 30 | .30 | | |
| | Effluent streams: | | | | | |
| (56) | From top of 20 to atmosphere (87% relative humidity) | 730,450 | 41,185 | none | Vapor | 113 |
| (71) | Recycle liquid | | 1,275 | 88.45 | Liquid | 120 |

II. UREA PROCESS

Figure 2:
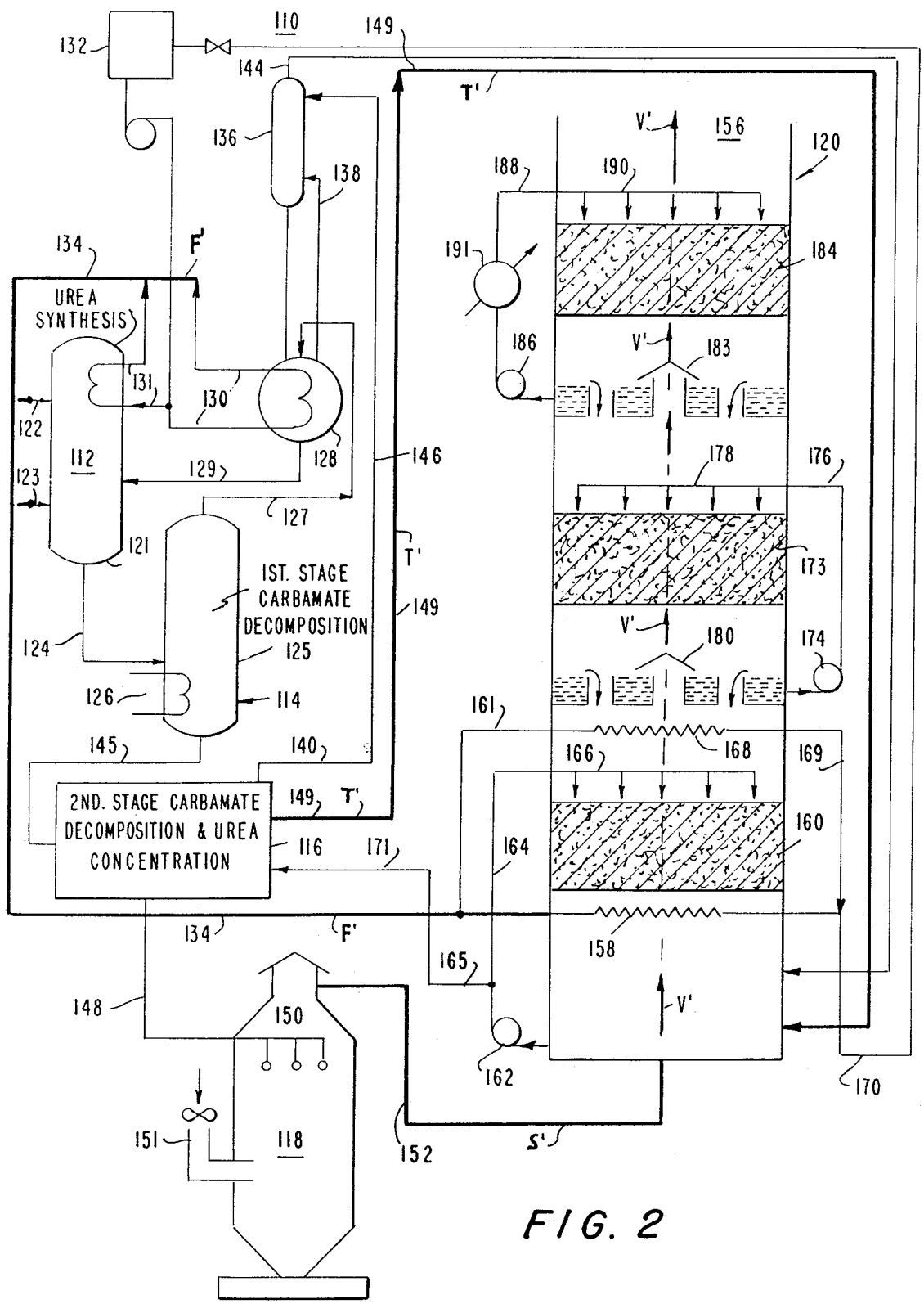
FIG. 2 is a schematic representation of a urea process incorporating the present invention.

In FIG. 2 there is illustrated a further embodiment of the invention in which corresponding parts have been designated by the same reference numerals as part of a "100" series. Also, the corresponding contaminant streams have been designated by the same reference letters as part of a "prime" series comprising F', S', and T'. In this form of the invention, there is shown a urea fertilizer process generally designated by the reference numeral 110 which comprises a reactor zone 112, a first stage decomposition and carbamate recovery zone 114, a second stage carbamate decomposition and urea concentration zone 116, a prilling tower 118, and a pollution control system 120.

As is found in a typical urea process, the reaction zone 112 consists primarily of an autoclave 121 into which ammonia and $CO_2$ are introduced respectively by line 122 and line 123. The ammonia and carbon dioxide react in the autoclave 121 to form ammonium carbamate, a portion of which reacts to produce urea and water, as follows:

$$NH_4 \, CO_2 \, NH_2 \rightarrow NH_2 \, CO \, NH_2 + H_2O \quad (1)$$

The amount of carbamate converted to urea will vary in accordance with the particular urea process which is used, and the solution leaving the autoclave 121 includes urea, water, unreacted carbamate, and excess ammonia when it is used in the process.

A line 124 is connected to the first stage carbamate decomposition zone 114 which consists primarily of a reaction vessel 125 in which a portion of the unreacted carbamate is decomposed to ammonia and carbon dioxide. This is achieved by indirect heat exchange with steam at intermediate pressure, by means of the heating element 126. The mixture of carbon dioxide and ammonia gas pass overhead through the line 127 to a condenser 128 and is condensed to form a liquid carbamate solution which is recycled through line 129 into the autoclave 121. It should be noted that the conditions in the condenser 128 are such that it is customary to remove the heat of condensation by the generation of relatively low pressure steam, such as by a circuit 130. A similar low pressure steam circuit 131 may also be provided in the overhead portion of the autoclave 121. The low pressure steam circuits 130 and 131 are supplied with feedwater by a feedwater tank 132 through a common line 133, and the steam generated is sent to the pollution control system 120 through a common steam line 134. The low pressure steam in line 134 has been designated by directional arrows and the reference letter F′.

It should be noted that it is the general practice in urea processes to inject oxygen or air into the carbon dioxide feed for the purpose of preventing corrosion. This gas along with other inert gases in the ammonia or carbon dioxide stream is not condensed in carbamate condenser 128 and is vented to a scrubber 136 through line 138. Thus, a carbamate solution which is formed at low pressure in zone 116 is passed through line 140 into the scrubber 136 to scrub ammonia and carbon dioxide out of the vent gas, and this solution is returned via line 142 to the carbamate condenser 128 from which the rest of the carbamate is condensed and returned via line 129 to autoclave 121. The inert gases leaving the scrubber 136 although largely depleted of ammonia and carbon dioxide still contains both of these compounds and the ammonia is considered a pollutant, such that this stream is therefore directed to the pollution control system 120 through line 144.

The solution leaving the bottom of reaction vessel 125 consists essentially of urea, water, and unreacted carbamate which is conveyed through line 145 into the second stage decomposition zone 116. The carbamate which is in solution, is decomposed at a relatively low pressure in zone 116, by means of a conventional heating element and contacting tower arrangmeent, which is well known in the art and consequently has not been shown in the drawings In this manner, the remaining carbamate is decomposed to ammonia and carbon dioxide vapor with a minimum amount of water being present. This vapor stream passing overhead from the contacting tower is condensed at low pressure to form an ammonium carbamate solution which is pumped via line 146 to scrubber 136. In zone 116 the urea solution is concentrated to a nearly anhydrous condition and is passed down through line 148 into the prilling tower 118. The water evaporated is equivalent to the water produced in the urea producing reaction given above. This water is condensed and the condensate produced is contaminated with traces of urea, ammonia and carbon dioxide and thus is a source of pollution. Other processes may use a very low pressure absorption and moderate pressure stripping system for further recovery of ammonia and carbon dioxide but in any case a liquid stream of contaminated water is produced. This stream designated by the directional arrows and the reference letter "T′" is introduced into the bottom portion of air pollution control system 120 by means of a line 149 from zone 116 to pollution control system 120.

The prilling operation is similar to that used in the ammonium nitrate process 10, and accordingly, the urea concentrate solution is passed through line 148 into the nozzle system 150 at the uppermost section of the prilling tower 118, and an air movement system 151 is provided at the lower portion of the tower. Thus, dispersed droplets of urea can be gravity released from the top of the tower 118 in countercurrent flow to the stream from the air movement system 151 which is directed upwardly through the prilling tower 118. Accordingly, solidified prills of urea and water reach the bottom of the tower 118 and are usually transported by a conveyor system to a cooling kiln for further processing. The ascending air stream from the air movement system 151 is exhausted through the stack of the prilling tower 118, and forms a second stream of contaminants consisting of air and entrained particles of urea, which has been designated by directional arrows and the reference letter "S′". The second contaminant stream S′ is conveyed to the pollution control system 120 by means of line 152 which is connected between the prilling tower 118 and the bottom portion of the pollution control system 120.

In accordance with the present invention, the pollution control system 120 comprises a tower 156, the bottom portion of which is provided with a first heat exchange coil 158 and a lower scrubbing section 160 provided with a conventional bulk scrubbing medium. Thus, the tower 156 receives a by-product waste heat stream F′ in the form of low pressure steam through line 134, a second contaminant stream S′ through the line 152 and a third contaminant stream T′ through the line 149. It should be noted that the first stream F′ includes water vapor generated in the urea synthesis process which is condensed in the pollution abatement process and returned to the urea process for revaporization. The second constream S′ contains a large volume of air in relation to the small amount of urea which is present. Since the low pressure steam of stream F′ is at a higher temperature than the second contaminant stream S′, the indirect heat exchange relationship results in a rise in the temperature of the second contaminant stream S′ thereby increasing the water carrying capacity of the second contaminant stream S′. The path of the second contaminant stream S′ in the tower 156 can be followed by the directional arrows designated V' and hereinafter referred to as the vapor stream V'.

Below the lower scrubbing section 160, the third contaminant stream T' is mixed with recirculation liquid and circulated by pump 162 into line 164 and distribution nozzle system 166. Thus, the third contaminant stream T' is sprayed above the first scrubbing section 160 where it is contacted with heated vapor stream V' to vaporize water while removing the entrained solid urea particles from vapor stream V'. A stream containing water and a moderately concentrated solution of the recovered contaminants is withdrawn from line 164 and returned to the second stage decomposition zone 116 via line 165. The water condensed above the nozzle system 166 passes into the feedwater tank 132 through the flow circuit consisting of line 167, heat exchange coil 168, line 169, and line 170.

A second pollution removal cycle is achieved in an intermediate scrubbing zone 173 by providing an intermediate pump 174 connected in a continuous line 176 to an intermediate spray nozzle system 178 which is in the upper portion of the intermediate scrubbing zone 173. A combined lower stack and trough structure 180 is disposed between the second heat exchange coil 168 and the intermediate scrubbing zone 173 for collecting and recirculating a more dilute solution of contaminants than in lower scrubbing zone 160. Accordingly, excess solution overflows into lower scrubbing zone 160 and during the second pollution removal cycle, low pressure steam is passed through lines 134 and 167 into the intermediate heat exchange 168 in indirect heat exchange relationship with the vapor stream V' passing upwardly from the lower scrubbing zone 160. During the second pollution removal cycle, the liquid which is collected along the lower stack and trough structure 180 is drawn off by means of the intermediate pump 174 through line 176 into the intermediate spray nozzle system 178 such that the contaminated liquid can be sprayed over the intermediate scrubbing zone 173 in countercurrent flow with respect to the ascending vapor stream V' which is passed upwardly through the second scrubbing zone 173. Thus, in the second pollution removal cycle, water free of contaminants is vaporized from the condensed portion of the pollution stream which is passed through the second spray nozzle system 178 and entrained urea particles are removed in the intermediate scrubbing zone 173.

A third pollution removal cycle is carried out by passing the vapor stream V' from the intermediate scrubbing zone 173 through an upper stack and trough structure 183 into an upper scrubbing zone 184. The solution of water and contaminants which is collected in the upper stack and trough structure 183 is drawn out of the tower 156 by means of an upper pump 186 which is connected in continuous line 188 to an upper spray nozzle system 190, disposed above the upper scrubbing zone 184. Accordingly, the contaminated water is dispersed through the upper spray nozzle system 190 over the third scrubbing zone 184 in countercurrent flow to the ascending vapor stream V' which is passing through the upper scrubbing zone 184. In this manner, the ascending vapor stream V' which passes through the upper scrubbing zone 184 can be exhausted into the atmosphere as air which is substantially free of contaminants. Included in the continuous line 188 is a cooler 191 designed to remove heat and thus condense water from vapor stream V' in upper scrubbing zone 184. It should be noted that the upper scrubbing zone 184 contains the most dilute solution of contaminants and excess solution from zone 184 and overflows onto the intermediate scrubbing zone 173.

In order to more clearly described and illustrate the advantages of the urea fertilizer process 110 of the present invention, reference is made to the following specific example:

EXAMPLE II

An example of the invention as applied to a typical total recycle urea production plant follows. All of the production is processed into urea prills.

Plant specification: Urea prill production.

| Pollutant streams fed to pollution control system 120 in lbs/hr | | Air | Water | Urea | NH₃ | CO₂ | Form | °F temp. |
|---|---|---|---|---|---|---|---|---|
| (144) | Inert vent | 1,700 | | | 18.8 | 1,000 | Vapor | 169 |
| (149) | Condensate | | 33,800 | 66 | 17.0 | 17.6 | Liquid | 250 |
| (152) | Prill tower vent | 1,200,000 | 20,000 | 160 | 20.0 | | Vapor | 120 |
| | Process steam fed to pollution control system 112 at 45 psig sat. | | 27,000 | | | | Vapor | |
| | Effluent streams: | | | | | | | |
| (156) | From top of 120 to atmosphere (66% relative humidity). | 1,200,000 | 51,620 | none | none | 873.6 | Vapor | 113 |
| (171) | Recycle liqiud | | 2,120 | 226 | 55.8 | 144 | Liquid | 120 |
| (170) | Recycle condensate | | 27,000 | | | | Liquid | 214 |

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In the manufacture of fertilizer, the continuous process which comprises passing a first stream containing water vapor generated as by-product low pressure steam during said manufacture of fertilizer into a heat exchange zone in indirect heat exchange relation with a second stream containing air and entrained fertilizer solids such that a portion of the water vapor from said first stream is condensed to increase the water carrying capacity of said second stream and feeding into said heat exchange zone a third aqueous stream containing dilute concentrations of fertilizer produced during said manufacture, and recirculating the condensed portion of said first stream in countercurrent contact with said second stream and third stream such that water free of contaminants is vaporized from said third stream and entrained solids are removed from said second stream, whereby substantially pure water and air can be removed and a fertilizer containing solution which can be used in said manufacture of fertilizer is produced.

2. A process according to claim 1 in which said first stream is at a higher temperature than said second stream such that water is condensed in said first stream and said heat exchange relationship results in a rise in temperature of said second stream whereby the water carrying capacity of said second stream is increased.

3. In the manufacture of ammonium nitrate fertilizer, the continuous process which comprises passing a first stream containing water and contaminants selected from the group consisting of ammonium nitrate, nitric acid, and nitric oxide which are produced during said manufacture of fertilizer into a heat exchange zone in indirect heat exchange relation with a second stream containing air and entrained ammonium nitrate particles such that a portion of the water vapor and contaminants from said first stream are condensed thereby increasing the water carrying capacity of said second stream, and recirculating the condensed portion of said first stream in countercurrent contact with said second stream from said heat exchange zone in a scrubbing zone such that water free of contaminants is vaporized from said condensed portion of said first stream and entrained solids are removed from said second stream, whereby substantially pure water and air can be removed and a fertilizer containing solution which can be used in said manufacture of fertilizer is produced.

4. A process according to claim 3 in which said first stream is at a higher temperature than said second stream such that water is condensed in said first stream and said heat exchange relationship results in a rise in temperature of said second stream whereby the water carrying capacity of said second stream is increased.

5. A process according to claim 3 in which a third stream containing water and contaminants selected from the group consisting of ammonium nitrate and ammonia is introduced into said heat exchange zone and brought into direct contact with said second stream to form a vapor stream.

6. A process according to claim 5 in which said heat exchange zone and said scrubbing zone comprise a tower in which a first heat exchange coil and a lower scrubbing zone are provided, and said first stream being conveyed into said first heat exchange coil.

7. A process according to claim 6 in which said vapor stream is passed in indirect heat exchange relation with said first heat exchange coil and then brought into contact with said lower scrubbing zone to remove entrained ammonium nitrate particles and vaporize the water.

8. A process according to claim 7 in which said tower includes lower spray distribution means disposed above said lower scrubbing zone for the recirculation of said condensed portion of said first stream.

9. A process according to claim 8 in which said tower includes a second heat exchange coil in flow communication with said first heat exchange coil disposed above said lower spray distribution means, a combined lower stack and trough means disposed above said second heat exchange coil, an intermediate scrubbing zone disposed above said lower trough and stack means, and an intermediate spray distribution means disposed above said intermediate scrubbing zone in flow communication with said lower trough and stack means, such that said first stream is conveyed into said second heat exchange coil, and said vapor stream is passed from said lower spray distribution means in indirect heat exchange relation with said second heat exchange coil, and then said vapor stream is passed through said lower stack and trough means into said intermediate scrubbing zone to remove entrained ammonium nitrate particles and vaporize the water, and recirculating the condensed portion from said lower stack and trough means to said intermediate spray distribution means in countercurrent contact with said vapor stream from said intermediate scrubbing zone.

10. A process according to claim 9 in which said tower includes a combined upper stack and trough means disposed above said intermediate spray distribution means, an upper scrubbing zone disposed above said upper stack and trough means, and an upper spray distribution means disposed above said upper scrubbing zone in flow communication with said upper trough and stack means such that said vapor stream is passed from said intermediate spray distribution means through said upper stack and trough means into said upper scrubbing zone to remove entrained ammonium nitrate particles and vaporize the water, and recirculating the condensed portion from said upper stack and trough means to said upper spray distribution means in countercurrent contact with said vapor stream from said upper scrubbing zone.

11. In the manufacture of urea fertilizer, the continuous process which comprises passing a first stream consisting essentially of relatively low pressure steam which is produced during said manufacture of fertilizer into a heat exchange zone in indirect heat exchange relation with a second stream containing air and entrained urea particles such that a portion of the steam and contaminants from said first stream are condensed thereby increasing the water carrying capacity of said second stream, and recirculating the condensed portion of said first stream in countercurrent contact with said second stream from said heat exchange zone in a scrubbing zone such that water free of contaminants is vaporized from said condensed portion of said first stream and entrained solids are removed from said second stream, whereby substantially pure water and air can be removed and a fertilizer containing solution which can be used in said manufacture of fertilizer is produced.

12. A process according to claim 11 in which said first stream is at a higher temperature than said second stream such that water is condensed in said first stream and said heat exchange relationship results in a rise in temperature of said second stream whereby the water carrying capacity of said second stream is increased.

13. A process according to claim 11 in which a third stream containing water and contaminants selected from the group consisting of carbamate and urea is introduced into said heat exchange zone and brought into direct contact with said second stream to form a vapor stream.

14. A process according to claim 13 in which said heat exchange zone and said scrubbing zone comprise a tower in which a first heat exchange coil and a lower scrubbing zone are provided, said first stream being conveyed into said heat exchange coil.

15. A process according to claim 14 in which said vapor stream is passed in indirect heat exchange relation with said first heat exchange coil and then brought into contact with said lower scrubbing zone to remove entrained urea particles and vaporize the water.

16. A process according to claim 15 in which said tower includes lower spray distribution means disposed above said lower scrubbing zone for the recirculation of said condensed portion of said first stream.

17. A process according to claim 16 in which said tower includes a second heat exchange coil in flow communication with said first heat exchange coil disposed above said lower spray distribution means, a combined lower stack and trough means disposed above said second heat exchange coil, an intermediate scrubbing zone disposed above said lower trough and stack means, and an intermediate spray distribution means disposed above said intermediate scrubbing zone in flow communication with said lower trough and stack means, such that said first stream is conveyed into said second heat exchange coil, and said vapor stream is passed through said lower stack and trough means into said intermediate scrubbing zone to remove entrained urea particles and vaporize the water, and recirculating the condensed portion from said lower stack and trough means into said intermediate spray distribution means in countercurrent contact with said vapor stream from said intermediate scrubbing zone.

18. A process according to claim 17 in which said tower includes a combined upper stack and trough means disposed above said intermediate spray distribution means, an upper scrubbing zone disposed above said upper stack and trough means, and an upper spray distribution means disposed above said upper scrubbing zone in flow communication with said upper trough and stack means such that said vapor stream is passed from said intermediate spray distribution means through said upper stack and trough means into said upper scrubbing zone to remove entrained urea particles and vaporize the water, and recirculating the condensed portion from said upper stack and trough means into said upper spray distribution means in countercurrent contact with said vapor stream from said upper scrubbing zone.

* * * * *